United States Patent
Hikmet et al.

(10) Patent No.: US 6,528,204 B1
(45) Date of Patent: Mar. 4, 2003

(54) LITHIUM SECONDARY BATTERY COMPRISING INDIVIDUAL CELLS WITH ONE ANOTHER, AS WELL AS WATCHES, COMPUTERS AND COMMUNICATION EQUIPMENT PROVIDED WITH A BATTERY

(75) Inventors: Rifat A. M. Hikmet, Eindhoven (NL); Hans Feil, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/521,053

(22) Filed: Mar. 8, 2000

(30) Foreign Application Priority Data

Sep. 22, 1999 (EP) ............................................. 99203098

(51) Int. Cl.[7] ............................................... H01M 6/46
(52) U.S. Cl. ....................................... 429/128; 429/153
(58) Field of Search ................................ 429/128, 127, 429/131, 136, 139, 153, 211, 217

(56) References Cited

U.S. PATENT DOCUMENTS

| | | | |
|---|---|---|---|
| 3,723,181 A | * | 3/1973 | Oakley |
| 3,775,188 A | * | 11/1973 | Oltman et al. |
| 4,092,464 A | * | 5/1978 | Dey et al. |
| 5,498,489 A | | 3/1996 | Dasgupta et al. ........... 424/152 |
| 5,525,441 A | * | 6/1996 | Reddy et al. |
| 5,547,780 A | * | 8/1996 | Kagawa et al. |
| 5,580,676 A | * | 12/1996 | Honda et al. |
| 5,633,097 A | * | 5/1997 | Miller |
| 5,776,628 A | | 7/1998 | Kraft et al. .................... 429/94 |
| 5,872,744 A | | 2/1999 | Taylor ........................... 368/13 |
| 5,911,947 A | | 6/1999 | Mitchell ..................... 29/623.2 |
| 6,132,477 A | * | 10/2000 | Warren |
| 6,235,425 B1 | * | 5/2001 | Hanson et al. |

FOREIGN PATENT DOCUMENTS

| | | | |
|---|---|---|---|
| EP | 0025663 A2 | 3/1981 | .......... H01M/10/04 |
| EP | 0602976 A1 | 6/1994 | ............ H01M/6/40 |
| EP | 0614237 A1 | 9/1994 | ............ H01M/6/40 |

OTHER PUBLICATIONS

Patent Abstracts of Japan, vol. 8, No. 235 (E–275) Oct. 27, 1984 JP59117073A.
Patent Abstracts of Japan, vol. 9, No. 204, (E–337) Aug. 21, 1985 JP60070669A.
09/352,314 filed Jul. 12, 1999. titled "Lithium Secondary Battery." Hikmet, Rifat.

* cited by examiner

Primary Examiner—Tom Dunn
Assistant Examiner—Jonathan Johnson
(74) Attorney, Agent, or Firm—Dicran Halajian

(57) ABSTRACT

A lithium secondary battery (5) comprising individual cells connected with one another, which cells each comprise a negative electrode including negative electrode material (9), a positive electrode including positive electrode material (10), a separator (6) sandwiched between the negative and the positive electrode, and a non-aqueous electrolyte solution between the negative and the positive electrode. The negative and the positive electrode material is provided in segments on the respective current collectors in order to increase the pliability of the battery. Common current collectors (7, 8) are used for all individual cells connected with one another.

12 Claims, 1 Drawing Sheet

LITHIUM SECONDARY BATTERY COMPRISING INDIVIDUAL CELLS WITH ONE ANOTHER, AS WELL AS WATCHES, COMPUTERS AND COMMUNICATION EQUIPMENT PROVIDED WITH A BATTERY

BACKGROUND OF THE INVENTION

The invention relates to a lithium secondary battery comprising individual cells connected with one another, which cells comprise
- a negative electrode comprising a negative electrode material and a negative current collector,
- a positive electrode comprising a positive electrode material and a positive current collector,
- a separator provided between the negative and the positive electrode,
- a non-aqueous electrolyte solution between the negative and the positive electrode, wherein
  both the negative and the positive electrode material is provided in segments on the respective current collector to increase the pliability of the battery. The invention further relates to certain applications of such a battery, in which applications demands are made on, in particular, the pliability of the battery, such as in watches and communication equipment, for example portable computers, personal digital assistants and mobile telephones.

Such a lithium secondary battery composed of individual cells connected with one another is known from U.S. Pat. No. 4,092,464. In accordance with the battery disclosed in this patent, the active electrode material can be provided in segments on the current collector to increase the flexibility of the battery, which means that the stress developed during bending is concentrated at the locations between the active segments of the current collector. Such a cell is manufactured from a lithium anode folded around a silver-chromate cathode, the anode and the cathode being separated from each other by a porous polypropene separator which extends beyond the dimensions of the cathode material. Since the polypropene used as the separator is a thermoplastic microporous material, this material, when heated, is capable of enclosing the cathode, whereby only one connection element is left uncovered. Around the lithium anode there is a second layer of polypropene, which layer extends at the circumference of the lithium anode and is sealed by heating, thereby enclosing both the lithium anode and the envelope containing the silver-chromate cathode, whereby only connection points for anode and cathode are exposed. The anode terminal is brought about via a metal strip formed by means of spot welding on the expanded current collector. A similar external electric connection with the cathode is also obtained by providing a metal strip on the cathodic current collector by means of spot welding. Finally, the anode and cathode strips are provided with a coating enabling the formation of a durable seal with respect to the outermost cell envelope. To attain a larger current capacity, such cells are arranged in parallel, whereby the external electrical connection points should be connected with one another. It has been found in practice that such connection points adversely affect the durability of a lithium secondary battery composed of individual cells connected with one another. In addition, the electrical resistance increases, which also adversely affects the efficiency of such a battery.

A lithium secondary battery comprising individual cells connected with one another is also known from U.S. Pat. No. 5,872,744. This patent does not teach, however, to provide both the negative and the positive electrode material in segments on the respective current collector to increase the pliability of the battery.

SUMMARY OF THE INVENTION

It is an object of the invention to provide a lithium secondary battery comprising individual cells connected with one another, which battery obviates the above-mentioned drawbacks.

Another object of the invention is to provide a lithium secondary battery comprising individual cells connected with one another, which battery is provided with electrode materials disposed in segments on the respective current collectors, such that the pliability of the eventual battery takes place in two dimensions.

A further object of the invention is to provide a lithium secondary battery comprising individual cells connected with one another, which battery does not exhibit delamination of the negative electrode, the positive electrode and the separator.

Yet another object of the invention is to provide a lithium secondary battery which can be manufactured in a thin and flexible form and wherein the contact between the electrodes and the electrolyte is maintained in a particular way.

A further object of the invention is to provide a battery which can suitably be used in an application which is subject to bending and corrugation, and wherein there are no restrictions as regards the geometrical configuration wherein the battery is incorporated. In accordance with the invention, in that the individual cells are interconnected by means of a current collector which is common to all cells.

As a result of the use of a common current collector for all cells, the individual cells do not have to be interconnected via external connection points. In addition, the common current collector endows the relevant lithium secondary battery with sufficient flexibility, so that this battery can suitably be used in applications wherein pliability and bendability are required, particularly in wrist watches and communication equipment which is worn around the wrist.

In a particular embodiment of the lithium secondary battery, preferably, both the negative and the positive current collector serves as a common current collector for every cell.

The use of both the negative and the positive current collector as a common current collector for all cells provides the battery with additional power, so that long-term durability is guaranteed.

In another, preferred embodiment, the mutual connection between the individual cells in the lithium secondary battery is also brought about by means of a common separator for all cells.

In such a particular embodiment of the invention, both the separator and one or both current collectors are the same for every cell. In a particular embodiment of the relevant lithium secondary battery it is thus possible that the lithium secondary battery composed of individual cells connected with one another comprises a common negative current collector, a common positive current collector, and a common separator.

To obtain the desired pliability of the battery, it is preferred in a particular embodiment that the electrode material provided in segments on the current collector extends substantially throughout the width of the relevant current collector.

In accordance with such an embodiment, in fact, pliability in one dimension is obtained, the desired pliability being obtained at locations where there is no active electrode material.

If, however, pliability of the battery in two dimensions is desired, it is preferred that the electrode material provided in segments on the current collector is situated on the relevant current collector in accordance with a chessboard-like pattern.

The term "chessboard-like pattern" as used in the description should be construed as a pattern of active electrode material, such that each segment of active electrode material does not border on another segment of active electrode material. As a result, discrete segments of active electrode material are situated on the current collector, so that the desired pliability in two dimensions is obtained.

In the lithium secondary battery in accordance with the invention, preferably carbon or graphite is used as the negative electrode material.

The positive electrode material used in the relevant battery is preferably selected from lithium transition metal oxides, such as $LiMn_2O_4$, $LiCoO_2$ or $LiNiO_2$, which material comprises electroconductive particles, such as carbon or graphite, and possibly binder material. Such positive electrode material may be considered to be a lithium-intercallation compound. The quantity of conductive material lies in the range from 0.1 to 15% by weight.

To obtain a lithium secondary battery which can be manufactured so as to be thin and flexible, preferably, the contact between the electrodes and the electrolyte is maintained in a specific manner, more particularly in that the negative electrode material, the positive electrode material and the separator are preferably provided with a pattern of apertures, said apertures being filled with a polymer-like material which holds together the negative electrode, the positive electrode and the separator.

Such a construction is described in international patent application WO 00/4601, which corresponds to U.S. application Ser. No. 09/352,314 filed Jul. 12, 1999, which is incorporated herein by reference. The apertures in the electrode materials are macroscopic apertures having a diameter of approximately 1 mm. In accordance with a particular embodiment, the pattern of the apertures forms a rectangular two-dimensional arrangement with an interspace between the apertures of 5 mm. The dimensions of the apertures and the pattern are selected to be such that the active surface of the electrodes is preferably at least 90%, because the apertures filled with polymer-like material reduce the capacity of the electrodes, which can be attributed to the fact that the active electrode material is absent in these filled apertures.

As described hereinabove, the positive electrode material is a lithium-intercallation compound, which compound is dispersed in a polymeric binder matrix. As the polymers for the binder matrix use is made of thermoplastic polymers, including polysaccharide and polymers with rubber elasticity. Examples hereof include carboxymethyl cellulose, polytetrafluoroethene, polyethene, polypropene and styrene butadiene rubber. These polymers can be applied either individually or in combination with each other. The polymeric binder serves to bind together active material powders to preclude crack formation and to fix such powderous materials on the surface of the current collector. The quantity of polymeric binder lies in the range from 2 to 30% by weight.

For the current collector use can be made of any electric conductor unless a chemical reaction is induced in the battery. Examples of materials for the positive current collector (cathode) include stainless steel, aluminum and nickel. Examples of materials for the negative current collector (anode) include stainless steel, copper and nickel. The collector may be in the form of a foil, a film and a thin plate, which may be porous, punched or in the form of a network. The thickness of the collector generally ranges from 1 to 500 $\mu m$.

The separator provided between the positive and the negative electrode is an insulating film having both a high ion permeability and the desired mechanical strength. The separator prevents short-circuits between the negative and the positive electrode and preserves the electrolytic solution. A generally applied separator is made from glass fiber, or is the form of a porous plate of non-woven fabric manufactured from olefin-like polymers, such as polyethene or polypropene. The diameter of the pores generally ranges from 0.01 to 10 $\mu m$. The thickness of the separator generally ranges from 5 to 300 $\mu m$.

The battery structure in accordance with the invention can be activated with a number of compositions applied as liquid electrolyte solutions. For the solvent use can be made of an ester compound, such as ethylene carbonate, propylene carbonate, methylethyl carbonate, an ether compound, such as tetrahydrofuran, dimethylsulphoxide and mixtures thereof. Examples of the dissolved electrolyte comprise salts of lithium ions ($Li^+$) and Lewis acid ions ($PF_4^-$, $PF_6^-$, $AsF_6^-$, $ClO_4^-$, $CF_3SO_3^-$) and mixed salts thereof. The concentration of the salt generally ranges between 0.5 and 2 mol/l.

The battery in accordance with the invention is enclosed in a battery envelope, which may be a synthetic envelope, or a metal-like or resin-like envelope. Examples of such materials include stainless steel and plastics such as polypropene. Sealing can be brought about by means of an adhesive, or by welding or soldering. A flat flexible battery may be enclosed in an air and moisture-resistant envelope of polymer-covered aluminum foil. Such foils are commercially available and can be sealed at the edges.

The lithium secondary battery comprising individual cells connected with one another, in accordance with the invention, comprises, preferably, a stack of cells which comprise a negative electrode, a positive electrode, a separator and a non-aqueous electrolyte.

The invention further relates to the particular application of the batteries described hereinabove, the battery in question being employed, in particular, in applications imposing high demands as regards pliability, durability and current efficiency. Particularly, preferred applications include, inter alia, watches, whereby the battery is incorporated in the strap of the watch, communication equipment, such as portable telephones, and portable computers.

These and other aspects of the invention will be apparent from and elucidated with reference to the embodiments described hereinafter.

DETAILED DESCRIPTION OF THE PREFERRED EMBODIMENTS

Figure 1:
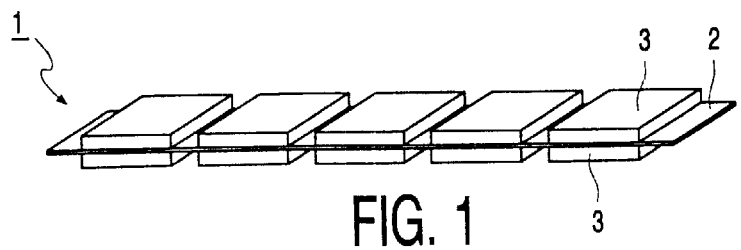
FIG. 1 is a perspective of a linear segmented electrode.

FIG. 1 diagrammatically shows an electrode 1 which is segmented on both sides, and a current collector 2 which is provided with active electrode material 3 on the lower side as well as the upper side, the active electrode material 3 provided on the current collector 2 extending substantially throughout the width of the current collector 2. By virtue of the fact that the active electrode material 3 is provided in segments on the current collector 2, it is possible to bend the electrode 1 without delamination of active electrode material 3 and current collector 2.

Figure 2:
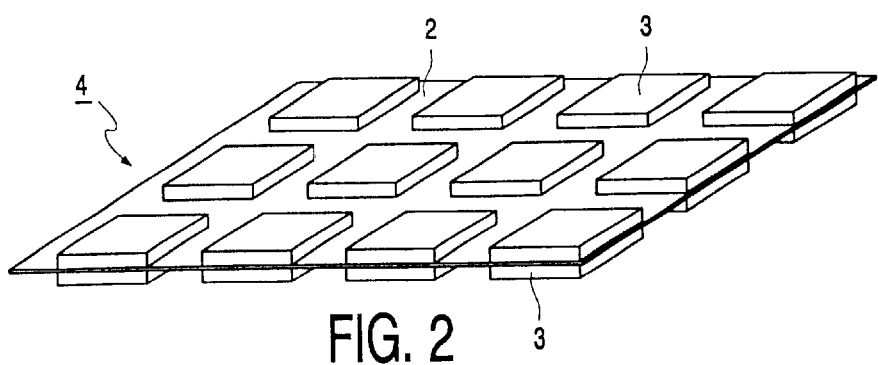
FIG. 2 is a perspective of a two-dimensional segmented electrode.

FIG. 2 diagrammatically shows an electrode 4 which is segmented on both sides, the active electrode material 3 being provided on both sides of the current collector 2 in accordance with a chessboard-like pattern. An electrode 4 embodied in this manner can be bent in two dimensions because the active electrode material 3 is present in discrete islands on the current collector 2.

Figure 3:
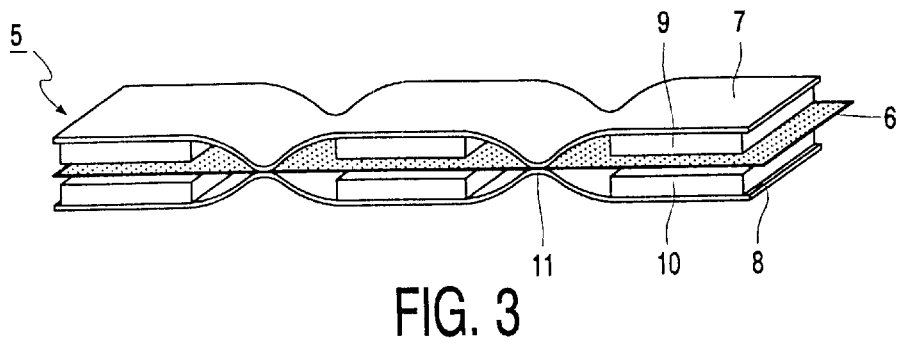
FIG. 3, is a perspective of a battery incorporating the segmented electrode.

FIG. 3 diagrammatically shows a battery 5 composed of three individual segments or cells, both the current collector 7, 8 and the separator 6 being embodied so as to be common to all cells, and each cell being built up of, in succession, a current collector 8, active electrode material 10, a separator 6, active electrode material 9 and a current collector 7. At the location referenced 11 there is no active electrode material 9, 10, so that a battery 5 can be readily bent at this location.

Figure 4:
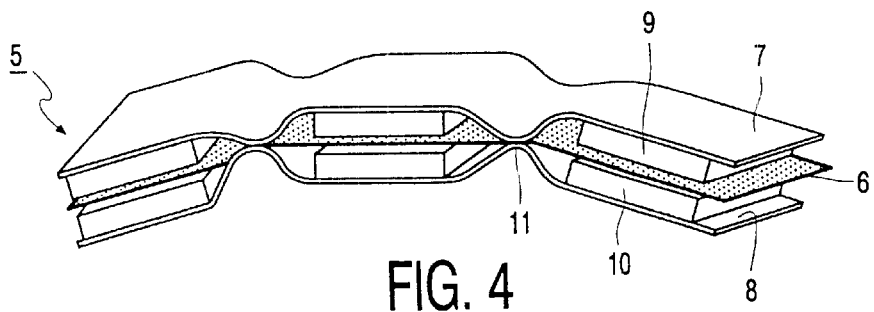
FIG. 4 is a perspective of the battery in a bent state.

Finally, FIG. 4 diagrammatically shows the battery 5 of FIG. 3 in a bent state, wherein bending is not hampered owing to the fact that the active material 9, 10 is present in segments.

EXAMPLE

A battery to be integrated in a wrist strap of a communication device which looks like a wrist watch is manufactured, the battery being composed of a stack of two positive electrodes segmented on one side, a positive electrode segmented on both sides, and two negative electrodes segmented on both sides, said electrodes being separated by separators. For the active electrode material use is made in the positive electrode of $LiCoO_2$, while the active electrode material of the negative electrode is MCMB (Meso Carbon Micro Beads having a diameter of 10 $\mu$m). The seperator is made from microporous polyethylene. The battery has a width of 10 cm and an overall thickness of approximately 1 mm, and is composed of 10 segments or cells, so that a sufficiently pliable battery is obtained. The capacinatance of the battery is approximately 100 mAh.

What is claimed is:

1. A lithium secondary battery comprising individual cells connected with one another, said cells comprising:
   a negative electrode comprising a negative electrode material and a negative current collector formed over said negative electrode material;
   a positive electrode comprising a positive electrode material and a positive current collector formed over said positive electrode material;
   a separator provided between the negative electrode and the positive electrode; and
   a non-aqueous electrolyte solution between the negative electrode and the positive electrode;
   wherein both the negative current collector and the positive current collector serve as a common current collector for every cell, and wherein the negative electrode material and the positive electrode material are absent from portions of said negative electrode and said positive electrode respectively, the negative current collector, the positive current collector and the separator being in contact with each other at said portions in unfolded position of said battery.

2. A lithium secondary battery comprising individual cells connected with one another, as claimed in claim 1, wherein said separator is common to all the cells for mutual connection between the cells.

3. A lithium secondary battery comprising individual cells connected with one another, as claimed in claim 2, wherein the electrode material provided in segments on the current collector extends substantially throughout the width of the relevant current collector.

4. A lithium secondary battery comprising individual cells connected with one another, as claimed in claim 1, wherein each of the segments do not border another one of the segments.

5. A lithium secondary battery comprising individual cells connected with one another, as claimed in claim 1, wherein carbon or graphite is used as the negative electrode material.

6. A lithium secondary battery comprising individual cells connected with one another, as claimed in claim 1, wherein the positive electrode material is selected from lithium transition metal oxides, including LiMn2O4, LiCoO2 or LiNiO2, which material comprises electroconductive particles, including carbon or graphite, and binder material.

7. A lithium secondary battery comprising individual cells connected with one another, as claimed in claim 1, wherein the negative electrode material, the positive electrode material and the separator are provided with a pattern of apertures, said apertures being filled with a filling material which holds together the negative electrode, the positive electrode and the separator.

8. A lithium secondary battery comprising individual cells connected with one another, as claimed in claim 7, wherein the filling material is a bonding agent.

9. A lithium secondary battery comprising individual cells connected with one another, as claimed in claim 7, wherein the filling material is polyethene.

10. A lithium secondary battery comprising individual cells connected with one another, as claimed in claim 1, wherein the individual cells are provided in an envelope of a laminate, which envelope is hermetically sealed.

11. A lithium secondary battery comprising individual cells connected with one another, as claimed in claim 1, wherein the cell is composed of a stack of cells comprising a negative electrode, a positive electrode, a separator and a non-aqueous electrolyte.

12. A lithium battery comprising cells connected with one another, each of said cells comprising:
   a negative electrode comprising a negative electrode material and a negative current collector formed over said negative electrode material;
   a positive electrode comprising a positive electrode material and a positive current collector formed over said positive electrode material;
   a separator provided between the negative electrode and the positive electrode; and
   an electrolyte located between the negative electrode and the positive electrode;
   wherein the negative current collector and the positive current collector serve as common current collectors for said cells, and wherein the negative electrode material and the positive electrode material are absent from portions of said negative electrode and said positive electrode respectively, the negative current collector, the positive current collector and the separator being in contact with each other at said portions in an unfolded position of said battery.

* * * * *